United States Patent
Kang et al.

(10) Patent No.: US 8,014,385 B2
(45) Date of Patent: Sep. 6, 2011

(54) INTEGRATED SWITCH AND SWITCHING METHOD FOR SIMULTANEOUSLY PROCESSING VOICE AND IP DATA IN THE SAME CHANNEL

(75) Inventors: Sung Soo Kang, Daejeon (KR); Choon Sik Yim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 588 days.

(21) Appl. No.: 12/155,132

(22) Filed: May 29, 2008

(65) Prior Publication Data
US 2009/0147776 A1 Jun. 11, 2009

(30) Foreign Application Priority Data
Dec. 6, 2007 (KR) .................. 10-2007-0126373

(51) Int. Cl.
*H04L 12/66* (2006.01)
(52) U.S. Cl. ........................ 370/352; 370/401
(58) Field of Classification Search .............. None
See application file for complete search history.

(56) References Cited

U.S. PATENT DOCUMENTS

| | | | | |
|---|---|---|---|---|
| 5,761,292 A * | 6/1998 | Wagner et al. | ............... | 379/229 |
| 6,044,266 A | 3/2000 | Kato | | |
| 6,611,536 B1 | 8/2003 | Ahmed | | |
| 6,907,030 B1 * | 6/2005 | Bladsjo et al. | ............... | 370/349 |
| 7,095,759 B1 | 8/2006 | Fitzgerald | | |
| 7,336,630 B2 * | 2/2008 | Hamalainen et al. | ......... | 370/329 |
| 7,551,603 B1 * | 6/2009 | Shaffer et al. | ................ | 370/352 |
| 2002/0075856 A1 * | 6/2002 | LeBlanc | ........................ | 370/352 |
| 2002/0116186 A1 * | 8/2002 | Strauss et al. | ................ | 704/233 |
| 2003/0078767 A1 * | 4/2003 | Nayak | ........................ | 704/200 |
| 2004/0001479 A1 * | 1/2004 | Pounds et al. | ................ | 370/352 |
| 2006/0239283 A1 | 10/2006 | Fitzgerald | | |
| 2008/0056259 A1 * | 3/2008 | Miyamoto | ................... | 370/391 |

* cited by examiner

*Primary Examiner* — Gregory B Sefcheck
*Assistant Examiner* — Daniel Mitchell
(74) *Attorney, Agent, or Firm* — Staas & Halsey LLP

(57) ABSTRACT

Provided are an integrated switch and a switching method for simultaneously processing IP data and voice signals using silent periods during communication. The integrated switch provides a function of transmitting data packets using the silent periods during the communication of an existing switch subscriber, so that an existing frequency band and apparatus can be used without use of a separate frequency band and a separate apparatus for data transmission such as an existing asymmetric digital subscriber line (ADSL). In addition, efficiency of an existing switch can be increased without use of an apparatus for collecting and processing data provided in front of subscriber line cards.

11 Claims, 6 Drawing Sheets

INTEGRATED SWITCH AND SWITCHING METHOD FOR SIMULTANEOUSLY PROCESSING VOICE AND IP DATA IN THE SAME CHANNEL

CROSS-REFERENCE TO RELATED PATENT APPLICATION

This application claims the priority of Korean Patent Application No. 2007-0126373, filed on Dec. 6, 2007, in the Korean Intellectual Property Office, the disclosure of which is incorporated herein in its entirety by reference.

BACKGROUND OF THE INVENTION

1. Field of the Invention

The present invention relates to an integrated switch and a switching method for simultaneously processing IP data and voice signals, and more particularly, to an integrated switch and a switching method for simultaneously processing IP data and voice signals using silent periods during communication between a switch subscriber and a counterparty.

The integrated switch according to the present invention provides a function of transmitting data packets using the silent periods during the communication of an existing switch subscriber, so that an existing frequency band and apparatus can be used without use of a separate frequency band and a separate apparatus for data transmission such as an asymmetric digital subscriber line (ADSL). In addition, efficiency of an existing switch can be increased without use of an apparatus for collecting and processing data disposed in front of subscriber line cards.

2. Description of the Related Art

In general, during a communication period, a voice channel is not entirely filled with voice signals. That is, the communication periods can be divided into talk-spurt periods in which voice signals are generated and silent periods in which voice signals are not generated and voice information is not transmitted.

According to some research, it is reported that the talk-spurt periods in which voice signals are generated and voice information is transmitted occupies less than 50% of the total communication period (refer to an article, "A study of on-off characteristics of conventional speech", H. H. Lee & C. K. Un, pp 630-637, IEEE Trans. on Comm., Vol. COM-34, No. 6, June 1986).

The International Telecommunication Union-Telecommunication (ITU) has standardized such characteristics of voice communication. Much research for transmitting different information during the silent periods of a voice communication channel has been conducted (refer to ITU-T Recommendation P. 59, "Telephone transmission quality objective measuring apparatus", March, 1993).

As examples of technology for transmitting voice signals and data packets in a circuit switching network, traditional circuit switching, fast circuit switching, and enhanced circuit switching have been proposed, and their advantages and disadvantages have been analyzed (refer to an article, "Voice/data integration using circuit switched networks", E. A. Harrington, pp 781-793, IEEE Trans. on Comm., Vol. COM-28, No. 6, June 1980).

According to the aforementioned document, when a gap between data and a message is relatively long, fast circuit switching is advantageous. When the gap is relatively short, traditional circuit switching is advantageous).

Enhanced circuit switching is introduced so as to enhance the two circuit switching schemes, that is, fast circuit switching and traditional circuit switching. In enhanced circuit switching, a common signal scheme is used. In addition, a time assigned speech interpolation (TASI) scheme is used for voice signal multiplexing, and an adaptive data multiplexing (ADM) scheme is used for data signal multiplexing.

According to a result of analysis of a circuit switching network using the enhanced circuit switching scheme, as the number of transmission channels between switch nodes is increased, different voice signals and data signals can be inserted in the silent periods. However, as the number of channels is small, the voice signals may be lost due to channel competition.

In addition, since paths of the data packets are handled directly by an internal portion of the switch, an increase in the number of channels leads to increased costs of switching.

U.S. Pat. No. 6,044,266 (Mar. 28, 2000) discloses a method of transmitting data in the silent periods of a mobile voice terminal in a wireless region. In the method, when the mobile voice terminal broadcasts information indicating that voice signals are not transmitted, a mobile data terminal measures an intensity of the signals of the mobile voice terminal to select the best channel and transmits the data with the same size of the signal of the mobile voice terminal in the silent periods.

According to U.S. Pat. No. 6,044,266, the communication channel can be used for transmitting data in the silent periods, that is, periods other than the talk-spurt periods in which the voice signals are transmitted, so that use efficiency of the voice channel can be increased.

However, the mobile voice terminal needs to inconveniently broadcast silent period information and to continuously measure intensities of output signals of neighboring mobile voice terminals. Therefore, the method is complicated and expensive.

In addition, in a case where a frequency hopping scheme is used due to security problems, the method cannot be directly used. The method can be used for only the wireless transmission region. Therefore, in an internal portion of the switch, the voice signals and the data need to be separately processed.

U.S. Pat. No. 7,095,759B1 (Aug. 22, 2006) discloses a statistical multiplexing method of processing voice signals and data signals at one time in a trunk for external connection of a private switch such as a private branch exchange (PRE).

In the statistical multiplexing method, the voice signals and the data signals are processed in one common resource (referred to as a pool). The statistical multiplexing method is based on a channel connection scheme. In addition, the statistical multiplexing method does not include a concept that the data is transmitted in a silent period.

US Patent Publication No. 2006/0239283 A1 (Oct. 26, 2006) discloses a statistical multiplexing control method of processing voice signals and data signals at one time in a private switch such as a private branch exchange (PBX). In this method, voice channels and data channels are processed as one common resource (pool).

The statistical multiplexing control method is also based on the channel connection scheme. In this method, packets are deleted according to priorities thereof, and the deleted packets are processed in upper layers. According to the method, a re-transmission request of the upper layer or the like may lead to deterioration in use efficiency of paths. In addition, the method does not include the concept that data is transmitted in silent periods.

U.S. Pat. No. 6,611,536 B1 (Aug. 26, 2003) discloses a method of transmitting voice signals together with data signals in a single RF channel. In the case of a plurality of channels, silent periods between the voice signals include silent gaps having a fixed length, and digital voice signals are transmitted in the silent gaps. For the transmission of the digital voice signals, data packets having a variable length are transmitted according to the silent gaps having the fixed length based on information of the silent gaps, which is obtained in advance.

In this method, a plurality of communication paths are needed. In addition, the method can be used only in the wireless transmission region excluding the switch.

Therefore, a technique is needed for processing voice signals together with data signals in an existing switch by transmitting data packets in silent periods in the same channel during communication without use of a separate frequency band and a separate apparatus for data transmission such as an existing ADSL for wire and wireless subscribers of the switch, capable of using the existing frequency band and apparatus without the need for an apparatus for collecting and processing data disposed in front of subscriber line cards.

SUMMARY OF THE INVENTION

The present invention provides an integrated switch and a switching method for transmitting data packets by using silent periods in the same channel during communication without the use of a separate frequency band and a separate apparatus for data transmission such as an existing asymmetric digital subscriber line (ADSL) in an existing voice channel of a wire/wireless subscriber line card of the switch.

The present invention also provides an integrated switch and a switching method of inserting data packets in silent periods during communication between a subscriber and a counterparty, extracting voice signals and data packets in input/output trunks connected to an external portion of the switch, and transmitting the voice signals and the data packets capable of increasing processing capacity of the switch without a separate apparatus for data transmission so as to use an existing frequency band and apparatus without use of an apparatus for collection and processing the data disposed in front of subscriber line cards and to allow the existing switch to process the voice signals as well as data packets. See claims According to an aspect of the present invention, there is provided an integrated switch simultaneously processing voices signals and IP data, comprising: a plurality of line cards which converts voice signals of a plurality of subscribers to digital voice signal, outputs, adds silent identifiers of silent periods of the voice signals of the subscribers to IP data of the subscribers, disposes the IP data including the silent identifiers in the silent periods of the digital voice signals of the subscribers, and outputs the digital voice signals and the IP data in the same channel; an internal switch which simultaneously switches the digital voice signals and the IP data including the silent identifiers in a time-division multiplexing scheme; and a plurality of input/output trunks which deletes the silent identifiers from the IP data comprising the silent identifiers among output data of the internal switch and transmits the IP data to an external IP data trunk and the digital voice signals among output of the internal switch to an external voice phone trunk.

According to another aspect of the present invention, there is provided an integrated switching method of simultaneously processing IP data and voice signals, comprising: converting the voices signals of a plurality of subscribers to digital voice signals and outputting the digital voice signals; adding silent identifiers of silent periods of the voice signals of the subscribers to the IP data of the subscribers; disposing the IP data including the silent identifiers in the silent periods of the digital voice signals of the subscribers and outputting the digital voice signals and the IP data in the same channel; simultaneously switching the digital voice signals and the IP data including the silent identifiers in a time-division multiplexing scheme; after the switching, deleting the silent identifiers from the IP data including the silent identifiers; transmitting the IP data with the silent identifiers deleted therefrom to an external IP data trunk; and after the switching, transmitting the digital voice signals of the subscribers to an external voice phone trunk.

According to another aspect of the present invention, there is provided an integrated switching method of simultaneously processing IP data and voice signals, comprising: detecting silent periods from the voice signals of a plurality of subscribers received from an external voice phone trunk; adding silent identifiers of the silent periods of the voice signals of the subscribers to the IP data of the subscribers received from an external IP data trunk; adjusting the IP data including the silent identifiers to be disposed in the silent periods of voice signal channels of the subscribers; simultaneously switching the voice signals of the subscriber and the IP data including the silent identifiers in a time-division multiplexing scheme; after the switching, deleting the silent identifiers from the IP data including the silent identifiers; after the switching, converting the voice signals of the subscribers to analog voice signals; transmitting the IP data with the silent identifiers deleted therefrom to data terminals of the subscribers; and transmitting the analog voice signals to wire/wireless communication apparatuses of the subscribers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the accompanying drawings.

Figure 1:
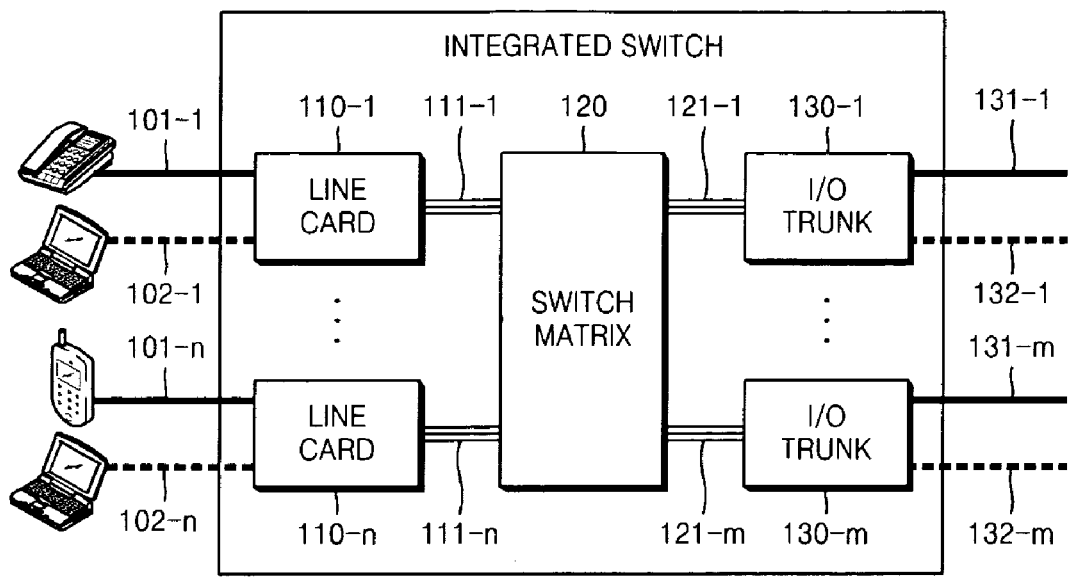
FIG. 1 is a block diagram illustrating an overall configuration of an integrated switch simultaneously processing IP packet data and voice signals, according to an embodiment of the present invention.

FIG. 1 is a block diagram illustrating an overall configuration of an integrated switch simultaneously processing IP packet data and voice signals, according to an embodiment of the present invention.

Referring to FIG. 1, the integrated switch according to the embodiment includes line cards 110-1, . . . , 110-*n* each connected to a subscriber terminal, an internal switch matrix 120, and I/O trunks 130-1, . . . , 130-*m*. The line cards 110-1, . . . , 110-*n* include portions 101-1, . . . , 101-*n* (having transmitting units and receiving units) connected to voice phones and portions 102-1, . . . , 102-*n* connected to data terminals, respectively.

The line cards 110-1, . . . , 110-*n* are connected to the internal switch matrix 120 via portions 111-1, . . . , 111-*n*.

The internal switch matrix 120 has a structure of a general time-division switch matrix.

The internal switch matrix 120 is connected to an external portion of the switch through the I/O trunks 130-1, . . . , 130-*m*.

Portions 131-1, . . . , 131-*m* of the I/O trunks 130-1, . . . , 130-*m* are used to be connected to the external portion in a voice signal scheme, and portions 132-1, . . . , 132-*m* are used to be connected to the external portion in an IP data signal scheme.

Figure 2:
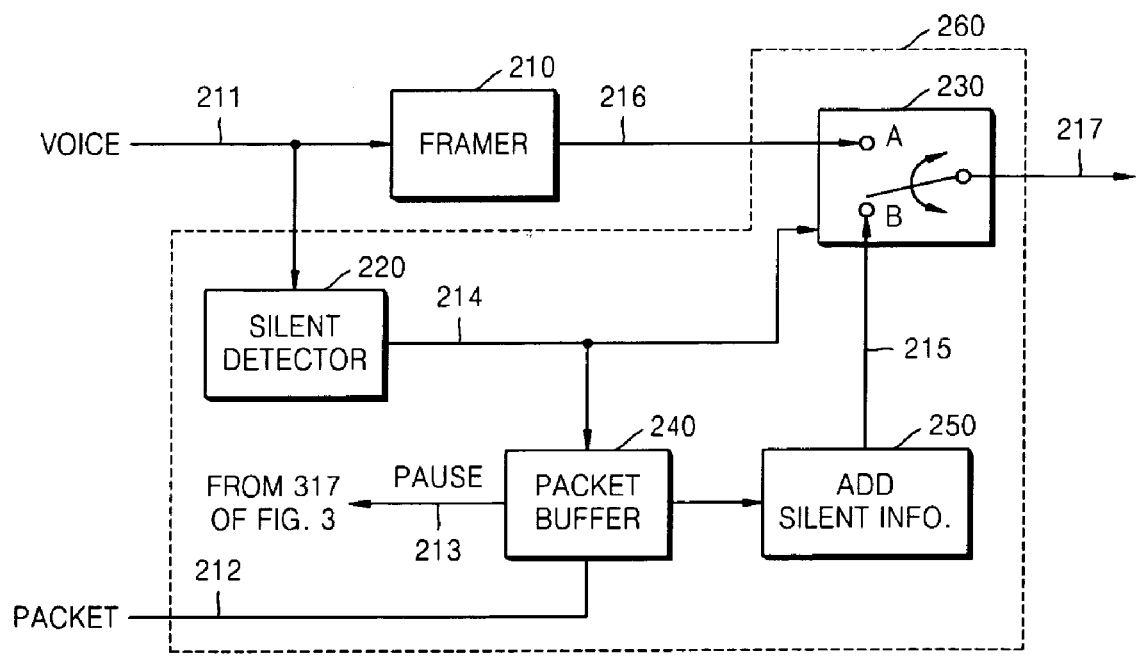
FIG. 2 is a block diagram of a receiving unit receiving voice signals and data of line cards in the integrated switch of FIG. 1, according to an embodiment of the present invention.

FIG. 2 is a block diagram of a receiving unit receiving voice signals and data of the line cards 110-1, . . . , 110-*n* in the integrated switch of FIG. 1, according to an embodiment of the present invention.

Referring to FIG. 2, the receiving-unit according to the embodiment includes a portion 211 connected to the voice phone I of the subscriber terminal, a portion 212 connected to the data terminal of the subscriber terminal, and an output portion 217 connected to the internal switch matrix 120 of FIG. 1 and which is the same as the receiving unit of each of the portions 111-1, . . . , 111-*n* of FIG. 1.

The receiving unit of FIG. 2 also includes a framer 210 which converts an analog voice signal to a digital signal, a silent detector 220 which detects a silent period in the analog voice signal, a packet buffer 240 which temporarily stores the IP data received from the data terminal of the subscriber terminal, a silent identifier adder ADD_SILENT_INFO 250 which adds information of the silent period in front of the packet, and a switch 230 which connects the output portion 217 to a portion 216 in a talk-spurt period when there is a voice signal of the subscriber.

In FIG. 2, portions excluding the silent detector 220, the packet buffer 240, the silent identifier adder 250, and the switch 230 are the same as subscriber line cards of a general time-division switch. The line cards 110-1, . . . , 110-*n* according to the current embodiment of the present invention are different from the line cards of a general time-division switch in that a portion 260 for simultaneously processing voice signals and data signals is further included in the embodiment.

In FIG. 2, when the silent detector 220 detects the silent period from the voice signal of the subscriber, the silent detector 220 requests the switch 230 to connect the output portion 217 to a portion 215 and the packet buffer 240 to transmit a stored packet of the subscriber to the silent identifier adder 250.

The silent identifier adder 250 adds the identifier of the silent period in front of the subscriber packet received from the packet buffer 240 and transmits the subscriber packet to the switch 230.

The switch 230 outputs the data packet (received through the portion 215) through the output portion 217.

When an internal buffer is filled with a predetermined number or more of packets, the packet buffer 240 outputs information for a pause request through the portion 213 to the data terminal of the subscriber terminal.

Figure 3:
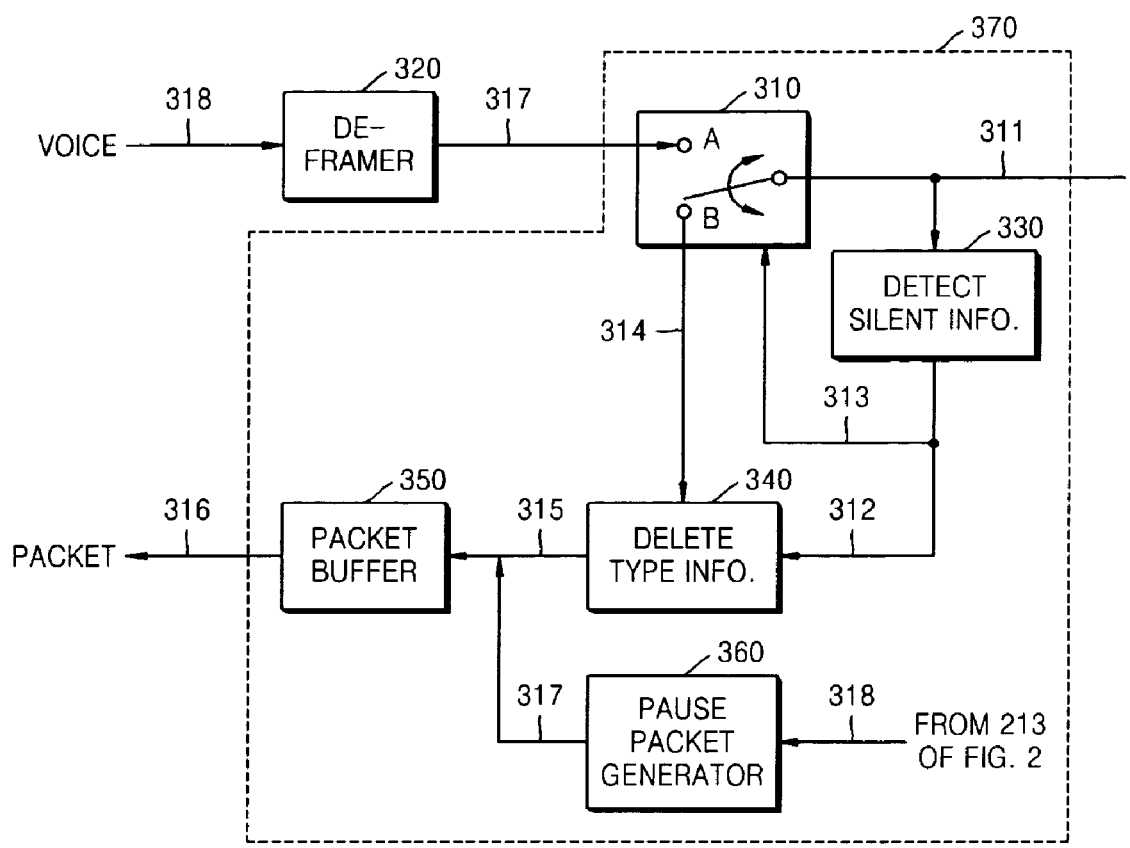
FIG. 3 is a block diagram of a transmitting unit transmitting voice signals and data of the line cards in the integrated switch of FIG. 1, according to an embodiment of the present invention.

FIG. 3 is a block diagram of a transmitting unit receiving voice signals and data of line cards 110-1, . . . , 110-*n* in the integrated switch of FIG. 1, according to an embodiment of the present invention.

Referring to FIG. 3, the transmitting unit according to the embodiment includes a portion 318 is connected to the voice phone of the subscriber terminal, a portion 316 connected to the data terminal of the subscriber terminal, and an input portion 311 connected to the internal switch matrix 120 of FIG. 1 and which is the same as the transmitting unit of each of the portions 111-1, . . . , 111-*n* of FIG. 1.

The transmitting unit of FIG. 3 also includes a de-framer 320 which converts a digital signal to an analog signal, a silent identifier detector DETECT_SILENT_INFOR 330 which detects an identifier of a silent period in the signal of the input portion 311, a packet buffer 350 which temporarily stores the IP data, a silent identifier deleting unit DELET_TYPE_INFO 340 which deletes the identifier from a packet data including the identifier of the silent period, a pause packet generator 360, and a switch 310 which maintains connection between the input portion 311 and a portion 317 when silent information is not detected.

In FIG. 3, portions (that is, a portion 370 for simultaneously processing voice signals and data signals and indicated by a dotted line) excluding the switch 310, the silent identifier detector 330, the silent identifier deleting unit 340, the packet buffer 350, and the pause packet generator 360 are the same as subscriber line cards of a general time-division switch.

The line cards 110-1, . . . , 110-*n* of the embodiment of the present invention are different from the line cards of a general time-division switch in that the portion 370 for simultaneously processing voice signals and data signals is further included in the embodiment.

In FIG. 3, when the silent identifier detector 330 detects the silent period from the voice signal of the subscriber, the silent identifier detector 330 requests the switch 310 to connect the input portion 311 to a portion 314.

The silent identifier deleting unit 340 receives packet information through the portion 314.

The silent identifier deleting unit 340 deletes the identifier of the silent period from the packet information received through the portion 314 from the switch 310 and transmits the packet information through the portion 315 to the packet buffer 350.

When receiving a pause request signal from the portion 213 of FIG. 2, the pause packet generator 360 generates pause packet information and transmits the pause packet information through the portion 317 to the packet buffer 350.

The packet buffer 350 transmits the packet data (received through the silent identifier deleting unit 340 and the pause packet generator 360) through the portion 316 to the data terminal of the subscriber terminal.

Figure 4:
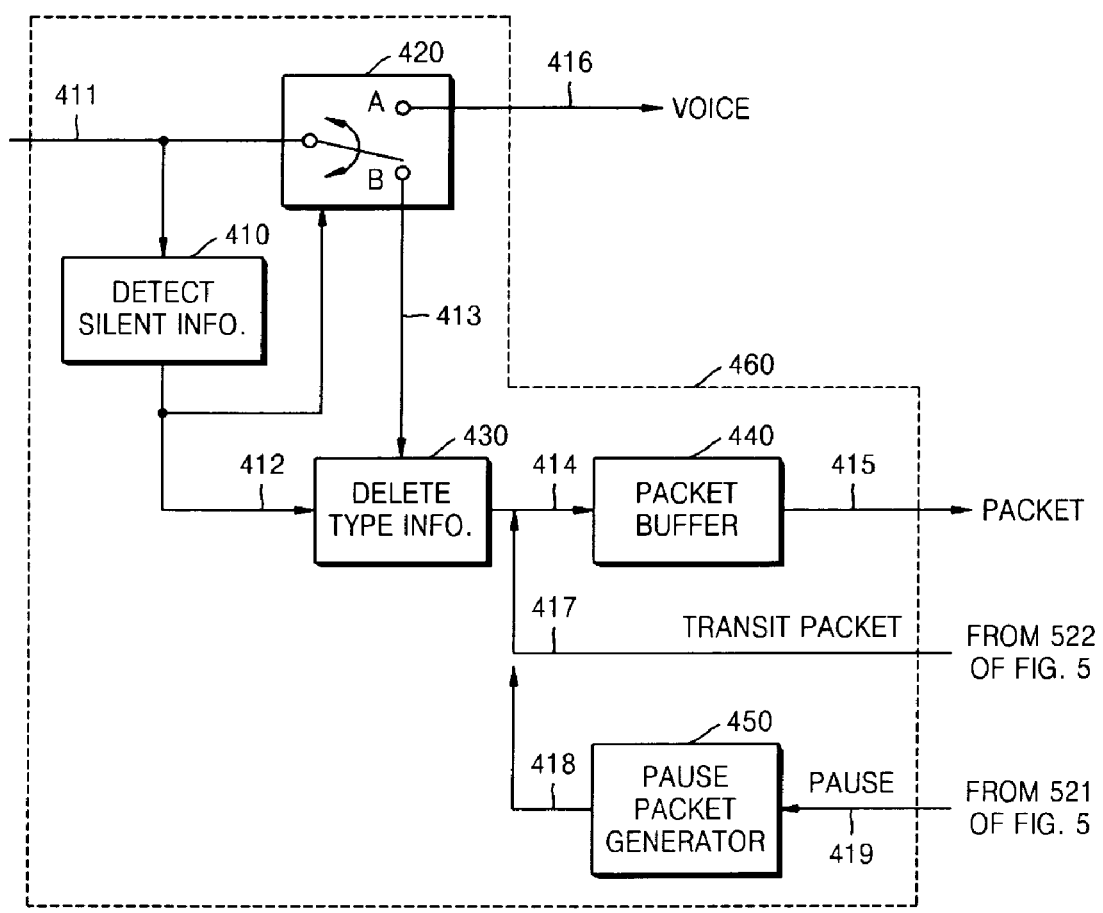
FIG. 4 is a block diagram of a transmitting unit (outgoing trunk) transmitting voice signals and data of I/O trunks in the integrated switch of FIG. 1 to an external portion of the integrated switch, according to an embodiment of the present invention.

FIG. 4 is a block diagram of a transmitting unit (outgoing trunk) transmitting voice signals and data of the I/O trunks 130-1, . . . , 130-*m* in the integrated switch of FIG. 1 to an external portion of the integrated switch, according to an embodiment of the present invention.

Referring to FIG. 4, the transmitting unit according to the embodiment includes a portion 416 connected to an external voice phone trunk, a portion 415 connected to an external IP data trunk, and a portion 411 connected to the internal switch matrix 120 of FIG. 1 and which is the same as the output unit (outgoing unit) of each of the portions 121-1, . . . , 121-m of FIG. 1.

The transmitting unit of FIG. 4 also includes a silent identifier detector DETECT_SILENT_INFOR 410 which detects an identifier of a silent period in a signal of the portion 411, a packet buffer 440 which temporarily stores the IP data, a silent identifier deleting unit DELET_TYPE_INFO 430 which deletes the identifier from packet data including the identifier of the silent period, a pause packet generator 450, and a switch 420 which maintains connection between the portion 411 and the portion 416 when silent information is not detected.

In FIG. 4, portions (that is, a portion 460 indicated by a dotted line) excluding the silent identifier detector 410, the switch 420, the silent identifier deleting unit 430, the packet buffer 440, and the pause packet generator 450 are the same as an output trunk (outgoing trunk) of a general time-division switch.

The output trunks of the embodiment of the present invention are different from the output trunks of a general time-division switch in that the portion 460 for simultaneously processing voice signals and data signals is further included in the embodiment.

In FIG. 4, when the silent identifier detector 410 detects silent information from a signal output from the integrated switch of FIG. 1, the silent identifier detector 410 requests the switch 420 to connect the input portion 411 to a portion 413.

The silent identifier deleting unit 430 receives packet information through the portion 413.

The silent identifier deleting unit 430 deletes the identifier of the silent period from the packet information received through the portion 413 from the switch 420 and transmits the packet information through the portion 414 to the packet buffer 440.

Figure 5:
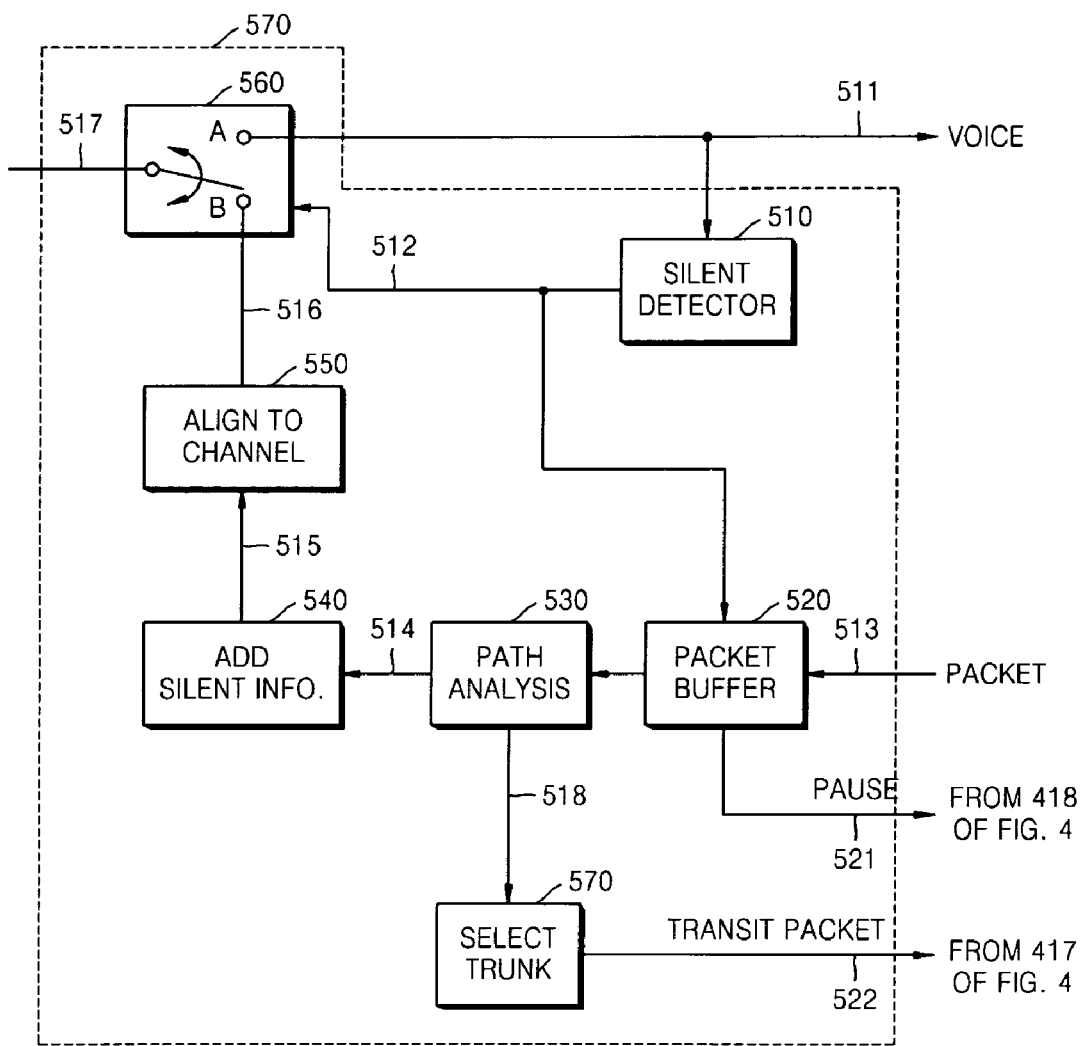
FIG. 5 is a block diagram of a receiving unit (incoming trunk) receiving voice signals and data of the I/O trunks in the integrated switch of FIG. 1 from an external portion of the integrated switch, according to an embodiment of the present invention.

When receiving a pause request signal from a portion 521 of FIG. 5, the pause packet generator 450 generates pause packet information through a portion 418 to the packet buffer 440.

The packet buffer 440 transmits the packet data (received through the silent identifier deleting unit 430 and the pause packet generator 460) through the portion 417 to an external portion in the IP data signal scheme.

FIG. 5 is a block diagram of a receiving unit (incoming trunk) receiving voice signals and data of the I/O trunks 130-1, . . . , 130-m in the integrated switch of FIG. 1 from an external portion of the integrated switch, according to an embodiment of the present invention.

Referring to FIG. 5, the receiving unit according to the embodiment includes a portion 511 connected to an external voice trunk, a portion 513 connected to an external IP data input trunk, and an output portion 517 connected to the internal switch matrix 120 of FIG. 1 and which is the same as the input unit of each of the portions 121-1, . . . , 121-m of FIG. 1.

The receiving unit of FIG. 5 also includes a silent detector 510 which detects a silent period in an input signal of the portion 511, a packet buffer 520 which temporarily stores IP data received from the portion 513, that is, an external IP input trunk, a silent identifier adder ADD_SILENT_INFO 540 which adds information of the silent period in front of the packet, a switch 560 which connects an output portion 517 to the portion 511 in a talk-spurt period when there is a voice signal of the subscriber, and a path analyzer 530 which analyzes a destination of the data packet stored in the packet buffer 520, and a trunk selector 570 which transmits the packet to an external portion of the integrated switch when the destination of the packet input through the portion 513 is not an internal portion of the integrated switch.

In FIG. 5, the receiving unit according to the embodiment is different from an input trunk of a general time-division switch in that the silent detector 510, the packet buffer 520, the path analyzer 530, the silent identifier adder 540, the channel adjuster 550, and the switch 560 are further included in the embodiment.

In FIG. 5, when the silent detector 510 detects the silent period from an input trunk signal, the silent detector 510 requests the switch 560 to connect the output portion 517 to a portion 516.

When a predetermined number or more of packets are received through the external IP input trunk 513, the packet buffer 520 transmits a pause request through the portion 521.

When the receiving packet buffer 520 transmits the received data packet to the packet path analyzer 530, the packet path analyzer 530 analyzes information of destination of the data packet. If the destination thereof is an internal portion of the integrated switch, the packet path analyzer 530 transmits the packet through the portion 514 to the silent identifier adder 540.

The silent identifier adder 540 adds the identifier of the silent period in front of the packet and transmits the packet to the channel adjuster 550.

The channel adjuster 550 adjusts the data packet to be disposed in the silent period of a channel corresponding to a voice phone number of the subscriber. The switch 560 transmits the data packet (received through the portion 516) to the output portion 517.

Figure 6:
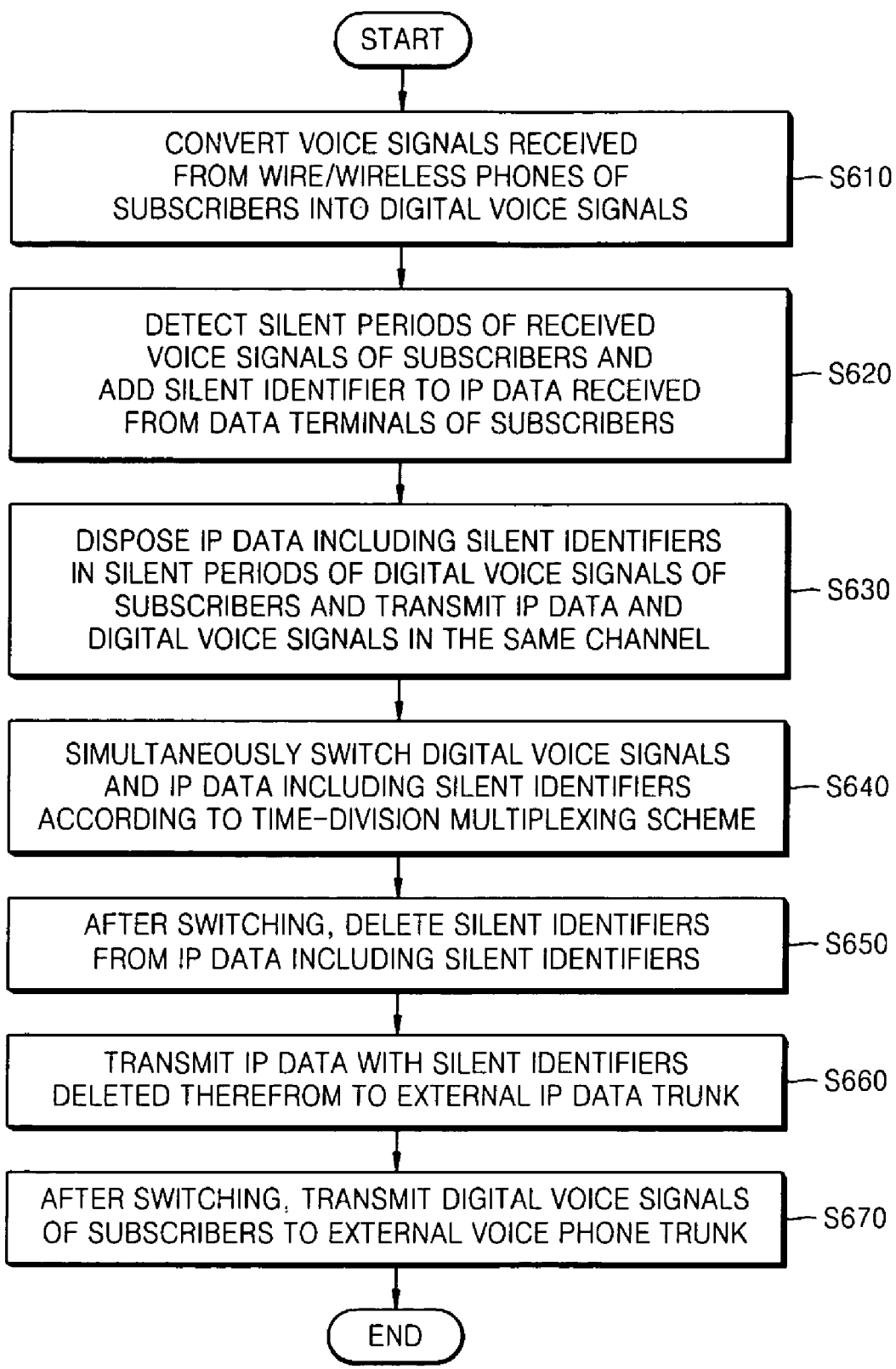
FIG. 6 is a flowchart illustrating a method of simultaneously processing IP packet data and voice signals transmitted from a subscriber to an external network using an integrated switch, according to an embodiment of the present invention.

FIG. 6 is a flowchart illustrating a method of simultaneously processing IP packet data and voice signals transmitted from a subscriber to an external network using an integrated switch, according to an embodiment of the present invention.

Voice signals received from wire/wireless phones of a plurality of subscribers are converted to digital voice signals, and the digital voice signals are output (S610).

Silent periods of the received voice signals of the subscribers are detected, and silent identifiers are added to IP data received from data terminals of the subscribers (S620).

The IP data including the silent identifiers is disposed in the silent periods of the digital voice signals of the subscribers, and the IP data is output in the same channel (S630).

The digital voice signals and the IP data including the silent identifiers are simultaneously switched in a time-division multiplexing scheme (S640).

After the switching, the silent identifiers are deleted from the IP data including the silent identifiers (S650).

The IP data with the silent identifiers deleted therefrom is transmitted to an external IP data trunk (S660).

After the switching, the digital voice signals of the subscribers are transmitted to an external voice phone trunk (S670).

Figure 7:
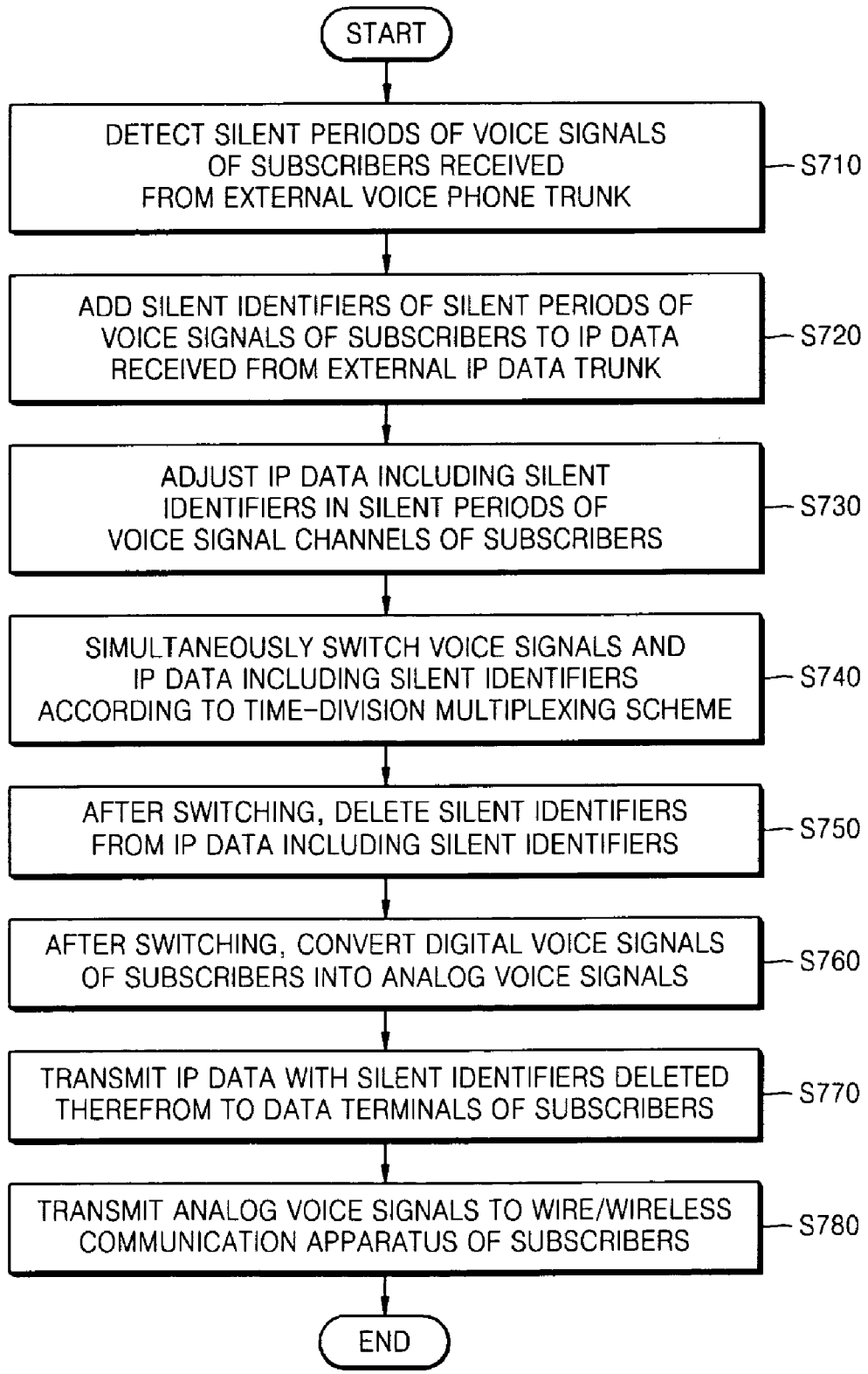
FIG. 7 is a flowchart illustrating a method of simultaneously processing IP packet data and voice signals transmitted from an external network to a subscriber using an integrated switch, according to an embodiment of the present invention.

FIG. 7 is a flowchart illustrating a method of simultaneously processing IP packet data and voice signals transmitted from an external network to a subscriber using an integrated switch, according to an embodiment of the present invention.

First, a silent period is detected from an analog voice signal that the subscriber receives from an external voice phone trunk (S710).

An identifier of the silent period of the voice signal of the subscriber is then added to IP data received from the external IP data trunk (S720).

The IP data including the silent identifier is adjusted to be disposed in the silent period of a voice signal channel of the subscriber (S730).

The voice signal of the subscriber and the IP data with the identifier added are simultaneously switched in a time-division multiplexing scheme (S740).

After the switching, the silent identifier is deleted from the IP data including the silent identifier (S750).

After the switching, the digital voice signal of the subscriber is converted to an analog voice signal (S760).

The IP data with the silent identifier deleted therefrom is transmitted to a plurality of subscribers (S770).

The analog voice signal is transmitted to wire/wireless communication apparatuses of the subscribers.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, it is possible to transmit data packets using silent periods in the same channel during communication without use of a separate frequency band and a separate apparatus for data transmission such as an existing ADSL in an existing voice channel of a wire/wireless subscriber line card of a switch.

Accordingly, it is possible to use an existing frequency band and an existing apparatus. There is no need for an apparatus for collecting and processing data disposed in front of a subscriber line card. In addition, data packets are inserted in silent periods during communication of a subscriber and a counterparty in the subscriber line card so that voice signals and data signals can be processed in an existing switch, and the voice signals and the data packets are separated from each other and transmitted in an input/output trunk connected to an external portion of the switch, so that it is possible to increase processing capacity of the switch without an separate apparatus for data transmission.

In addition, an integrated switch and a switching method according to the present invention can maintain a reliability and an availability of an existing switch in a data network.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An integrated switch simultaneously processing voice signals and IP data, comprising:
    a plurality of line cards to convert voice signals of a plurality of subscribers to digital voice signals, outputs, add silent identifiers identifying silent periods of the voice signals of the subscribers to IP data of the subscribers, dispose the IP data comprising the silent identifiers in the silent periods of the digital voice signals of the subscribers, and output the digital voice signals and the IP data in the same channel;
    an internal switch which simultaneously switches the digital voice signals and the IP data comprising the silent identifiers in a time-division multiplexing scheme; and
    a plurality of input/output trunks which delete the silent identifiers from the IP data comprising the silent identifiers among output data of the internal switch and transmit the IP data to an external IP data trunk and the digital voice signals among output of the internal switch to an external voice phone trunk so that the silent identifiers can be used to identify packets containing the IP data transmitted in silent periods.

2. The integrated switch of claim 1, wherein each of the line cards comprises:
    a framer which converts the voice signals of the subscribers to the digital voice signals;
    a silent detector which detects the silent periods of the voice signals of the subscribers;
    a packet buffer which temporarily stores the IP data;
    a silent identifier adder which adds the silent identifiers of the silent periods of the voice signals of the subscribers to the stored IP data; and
    a switch which outputs the IP data comprising the silent identifiers in the silent periods of the voice signals of the subscribers and outputs the digital voice signals in voice signal periods of the subscribers.

3. The integrated switch of claim 1, wherein each of the line cards comprises:
    a silent identifier detector which detects the IP data comprising the silent identifiers among the output data of the internal switch;
    a silent identifier deleting unit which deletes the silent identifiers from the detected IP data comprising the silent identifiers;
    a packet buffer which temporarily stores the IP data with the silent identifiers deleted there from and transmits the IP data to data terminals of the subscribers;
    a de-framer which converts the voice signals among the output data of the internal switch to analog voice signals and transmits the analog voice signals to wire/wireless communication apparatuses of the subscribers; and
    a switch which connects the output data of the internal switch to the silent identifier deleting unit if the IP data comprising the silent identifiers are detected and otherwise, connects the output data of the internal switch to the de-framer.

4. The integrated switch of claim 3, wherein
    the packet buffer stores the IP data received from the data terminals of the subscribers, and
    each of the line cards further comprises a pause packet generator which transmits information for a pause request to the data terminals of the subscribers when an amount of the IP data stored in the packet buffer is equal to or greater than a service level.

5. The integrated switch of claim 1, wherein each of the input/output trunks comprises:
    a silent identifier detector which detects the silent identifiers from the IP data comprising the silent identifiers which are switched by the internal switch;
    a silent identifier deleting unit which deletes the silent identifiers from the IP data comprising the silent identifiers;

a packet buffer which temporarily stores the IP data with the silent identifiers deleted therefrom and transmits the IP data to the external IP data trunk; and a switch which connects the IP data comprising the silent identifiers among the output data of the internal switch to the silent identifier deleting unit and transmits the digital voice signals to the external voice phone trunk.

6. The integrated switch of claim 5, wherein the packet buffer stores the IP data received from the external IP data trunk;

the input/output trunk further comprises a pause packet generator which transmits information for a pause request to the external IP data trunk when an amount of the IP data stored in the packet buffer is equal to or greater than a service level.

7. The integrated switch of claim 1, wherein each of the input/output trunks comprises:

a silent detector which detects the silent periods from the voice signals of the subscribers received from the external voice phone trunk;

a packet buffer which temporarily stores the IP data received from the external IP data trunk;

a path analyzer which analyzes destinations of the IP data stored in the packet buffer;

a trunk selector which transmits the IP data to the external IP data trunk when an analysis of the path analysis is that a destination of the IP data stored in the packet buffer is not in the subscribers;

a silent identifier adder which adds the silent identifier of the silent periods of the voice signals of the subscribers to the stored IP data;

a channel adjuster which adjusts the IP data comprising the silent identifiers to be disposed in the silent periods of the voice signal channels of the subscribers; and a switch which outputs the IP data comprising the silent identifiers adjusted by the channel adjuster in the silent periods of the voice signals of the subscribers and transmits the voice signals of the subscribers received from the external voice phone trunk to the internal switch in the voice signal periods of the subscribers.

8. An integrated switching method of simultaneously processing IP data and voice signals, the method comprising:

converting voice signals of a plurality of subscribers to digital voice signals and outputting the digital voice signals;

adding silent identifiers of silent periods of the voice signals of the subscribers to IP data of the subscribers;

disposing the IP data comprising the silent identifiers in the silent periods of the digital voice signals of the subscribers and outputting the digital voice signals and the IP data in the same channel;

simultaneously switching the digital voice signals and the IP data comprising the silent identifiers in a time-division multiplexing scheme;

after the switching, deleting the silent identifiers from the IP data comprising the silent identifiers;

transmitting the IP data with the silent identifiers deleted there from to an external IP data trunk; and after the switching, transmitting the digital voice signals of the subscribers to an external voice phone trunk so that the silent identifiers can be used to identify packets containing the IP data transmitted in silent periods.

9. An integrated switching method of simultaneously processing IP data and voice signals, the method comprising:

detecting silent periods from voice signals of a plurality of subscribers received from an external voice phone trunk;

adding silent identifiers of the silent periods of the voice signals of the subscribers to IP data of the subscribers received from an external IP data trunk;

adjusting the IP data comprising the silent identifiers to be disposed in the silent periods of voice signal channels of the subscribers;

simultaneously switching the voice signals of the subscribers and the IP data comprising the silent identifiers in a time-division multiplexing scheme;

after the switching, deleting the silent identifiers from the IP data comprising the silent identifiers;

after the switching, converting the voice signals of the subscribers to analog voice signals;

transmitting the IP data with the silent identifiers deleted therefrom to data terminals of the subscribers; and transmitting the analog voice signals to wire/wireless communication apparatuses of the subscribers.

10. The integrated switching method of claim 8, further comprising:

storing the IP data received from the data terminals of the subscribers; and when an amount of the stored IP data is equal to or greater than a service level, transmitting information for a pause request to the data terminals of the subscribers.

11. The integrated switching method of claim 9, further comprising:

storing the IP data received from the external IP data trunk; and when an amount of the stored IP data is equal to or greater than a service level, transmitting information for a pause request to the external IP data trunk.

* * * * *